(12) United States Patent
Wong

(10) Patent No.: US 8,584,044 B2
(45) Date of Patent: Nov. 12, 2013

(54) LOCALIZED THUMBNAIL PREVIEW OF RELATED CONTENT DURING SPATIAL BROWSING

(75) Inventor: Curtis Glenn Wong, Medina, WA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 11/941,098

(22) Filed: Nov. 16, 2007

(65) Prior Publication Data

US 2009/0132952 A1    May 21, 2009

(51) Int. Cl.
*G06F 3/048*    (2013.01)

(52) U.S. Cl.
USPC ........... 715/851; 715/764; 715/802; 715/810; 715/818

(58) Field of Classification Search
USPC ......... 715/705–714, 764–767, 771, 779, 781, 715/786–787, 802, 810, 817–821, 823, 825, 715/835–838, 850–855
See application file for complete search history.

(56) References Cited

U.S. PATENT DOCUMENTS

| | | | |
|---|---|---|---|
| 4,763,280 A | 8/1988 | Robinson |
| 5,396,583 A | 3/1995 | Chen |
| 5,473,746 A | 12/1995 | Pritt |
| 5,519,673 A | 5/1996 | Uehara |
| 5,555,354 A | 9/1996 | Strasnick |
| 5,617,332 A | 4/1997 | Fressoia |
| 5,675,746 A | 10/1997 | Marshall |
| 5,830,066 A | 11/1998 | Goden |
| 5,841,439 A | 11/1998 | Pose |
| 5,850,352 A | 12/1998 | Moezzi et al. |
| 5,864,337 A | 1/1999 | Marvin |
| 5,923,331 A | 7/1999 | Dusseux |
| 5,936,633 A | 8/1999 | Aono |
| 5,987,363 A | 11/1999 | Quan |
| 6,020,885 A | 2/2000 | Honda |
| 6,057,856 A | 5/2000 | Miyashita |
| 6,094,196 A | 7/2000 | Berry |
| 6,100,897 A | 8/2000 | Mayer et al. |
| 6,121,969 A | 9/2000 | Jain et al. |
| 6,154,213 A | 11/2000 | Rennison |
| 6,216,133 B1 | 4/2001 | Masthoff |

(Continued)

FOREIGN PATENT DOCUMENTS

WO    WO 2010/063014    6/2010

OTHER PUBLICATIONS

Roussopoulos, et al., "Direct Spatial Search on Pictorial Databases Using Packed R-trees", vol. 14, Issue 4, May 1985, ACM, pp. 17-31.

(Continued)

*Primary Examiner* — Enrique Iturralde
(74) *Attorney, Agent, or Firm* — L. Alan Collins; Collins & Collins Intellectual, LLC

(57) ABSTRACT

Technologies, systems, and methods for exploring a virtual space without cluttering or obscuring a field of view of the virtual space with overlaid names, labels, symbols, markers, and the like. Instead, a user may select objects of interest presented in a context bar to locate them in the field of view. Further, the user can make use of various forms of selection to zoom in on objects or points in the field of view and access information regarding the virtual space and objects without adding persistent clutter to the field of view.

20 Claims, 8 Drawing Sheets

(56) References Cited

U.S. PATENT DOCUMENTS

| | | | |
|---|---|---|---|
| 6,271,853 B1 | 8/2001 | Oxaal | |
| RE37,356 E | 9/2001 | Hori | |
| 6,301,586 B1 | 10/2001 | Yang et al. | |
| 6,321,158 B1 | 11/2001 | DeLorme et al. | |
| 6,331,853 B1 | 12/2001 | Miyashita | |
| 6,346,938 B1 | 2/2002 | Chan | |
| 6,400,375 B1 | 6/2002 | Okudaira | |
| 6,525,732 B1 | 2/2003 | Gadh | |
| 6,545,687 B2 | 4/2003 | Scott et al. | |
| 6,687,387 B1 | 2/2004 | Molnar | |
| 6,751,620 B2 | 6/2004 | Orbanes | |
| 6,776,618 B1 | 8/2004 | D'Zmura | |
| 6,781,598 B1 | 8/2004 | Yamamoto | |
| 7,069,506 B2 | 6/2006 | Rosenholtz et al. | |
| 7,072,764 B2 | 7/2006 | Donath et al. | |
| 7,096,428 B2 | 8/2006 | Foote et al. | |
| 7,158,878 B2 | 1/2007 | Rasmussen et al. | |
| 7,213,214 B2 | 5/2007 | Baar et al | |
| 7,228,507 B2 | 6/2007 | Good | |
| 7,257,261 B2 | 8/2007 | Suh | |
| 7,292,243 B1* | 11/2007 | Burke | 345/440 |
| 7,467,356 B2 | 12/2008 | Gettman | |
| 7,646,394 B1 | 1/2010 | Neely, III | |
| 7,657,845 B2 | 2/2010 | Drucker | |
| 7,725,820 B2 | 5/2010 | Wong | |
| 7,735,018 B2 | 6/2010 | Bakhash | |
| 8,081,186 B2 | 12/2011 | Wong | |
| 2001/0030667 A1* | 10/2001 | Kelts | 345/854 |
| 2002/0029226 A1 | 3/2002 | Li et al. | |
| 2002/0054134 A1 | 5/2002 | Kelts | |
| 2002/0075311 A1 | 6/2002 | Orbanes | |
| 2002/0093541 A1 | 7/2002 | Schileru-Key | |
| 2002/0109680 A1 | 8/2002 | Orbanes et al. | |
| 2002/0141659 A1 | 10/2002 | Florin | |
| 2002/0158917 A1 | 10/2002 | Sinclair | |
| 2003/0005439 A1 | 1/2003 | Rovira | |
| 2003/0063133 A1 | 4/2003 | Foote | |
| 2003/0151605 A1 | 8/2003 | Dominici | |
| 2003/0210281 A1 | 11/2003 | Ellis et al. | |
| 2003/0222901 A1 | 12/2003 | Houck et al. | |
| 2004/0070602 A1 | 4/2004 | Kobuya | |
| 2004/0205628 A1 | 10/2004 | Rosenholtz et al. | |
| 2005/0021677 A1 | 1/2005 | Musha | |
| 2005/0210399 A1 | 9/2005 | Filner et al. | |
| 2006/0158722 A1 | 7/2006 | Fujimoto | |
| 2006/0174209 A1* | 8/2006 | Barros | 715/764 |
| 2006/0187223 A1 | 8/2006 | Yamaguchi | |
| 2006/0236251 A1 | 10/2006 | Kataoka et al. | |
| 2006/0271280 A1 | 11/2006 | O'Clair | |
| 2007/0011617 A1 | 1/2007 | Akagawa | |
| 2007/0097246 A1 | 5/2007 | Adams | |
| 2007/0118818 A1 | 5/2007 | Gunderson et al. | |
| 2007/0150186 A1 | 6/2007 | Ingulsrud | |
| 2007/0183685 A1 | 8/2007 | Wada | |
| 2007/0247439 A1 | 10/2007 | Daniel | |
| 2008/0024523 A1 | 1/2008 | Tomite | |
| 2008/0049012 A1 | 2/2008 | Bar-Joseph | |
| 2008/0059205 A1 | 3/2008 | Dayan | |
| 2008/0062202 A1 | 3/2008 | Schulz | |
| 2008/0086696 A1 | 4/2008 | Sri Prakash | |
| 2008/0091654 A1 | 4/2008 | Kang | |
| 2008/0109761 A1 | 5/2008 | Stambaugh | |
| 2008/0231643 A1* | 9/2008 | Fletcher et al. | 345/661 |
| 2008/0263460 A1 | 10/2008 | Altberg | |
| 2009/0128565 A1 | 5/2009 | Wong | |
| 2009/0132967 A1 | 5/2009 | Wong | |
| 2009/0300528 A1 | 12/2009 | Stambaugh | |
| 2009/0307618 A1 | 12/2009 | Lawler | |
| 2010/0085383 A1 | 4/2010 | Cohen | |
| 2012/0042282 A1 | 2/2012 | Wong | |
| 2012/0069014 A1 | 3/2012 | Wong | |

OTHER PUBLICATIONS

Kuipers, et al., "A Robot Exploration and Mapping Strategy Based on a Semantic Hierarchy of Spatial Representations", Journal of Robotics and Autonomous Systems, MIT Press, 1991, pp. 1-23.

Engelen, et al., "Environment Explorer: Spatial Support System for the Integrated Assessment of Socio-Economic and Environmental Policies in the Netherlands", First Biennial Conference of the International Environmental Modelling and Software Society, Jun. 2002, pp. 12.

Gray, et al., "The World-Wide Telescope, an Archetype for Online Science", Technical Report, Microsoft Research, Jun. 2002, pp. 6.

"Views", retrieved on Aug. 29, 2007 at <<http://www-03.ibm.com/easy/page/91>>, pp. 1-7.

"Star Dome Help", Kalmbach Publishing Co., 2007, pp. 1-3.

"Census 2000 Mapping Help", retrieved on Aug. 29, 2007 at <<http://marineeconomics.noaa.gov/socioeconomics/Help/census2000_overview.html>>, pp. 1-5.

"A Brief Orientation", retrieved on Aug. 29, 2007 at << http://www.edc.uri.edu/Eelgrass/brieforientation.html>>, p. 1.

"Making Sense of Geographic Data with Dundas Map and AJAX", Dundas Software, 2006, pp. 1-5.

Lam, et al., "Summary Thumbnails: Readable Overviews for Small Screen Web Browsers", CHI 2005, Apr. 2-7, 2005, ACM, pp. 681-690.

"Thumbnail Preview in Object Selection", Microimages Inc., © MicroImages, Inc. 2007, p. 1.

Czerwinski, et al., "The Contribution of Thumbnail Image, Mouseover Text and Spatial Location Memory to Web Page Retrieval in 3D", Microsoft Research, 1999, pp. 8.

Cockborn, et al., "Faster Document Navigation with Space-Filling Thumbnails", CHI 2006, Apr. 22-27, ACM, 2006, pp. 10.

Porter, "High Resolution Image Viewing and Annotation Tools for Plone", Mar. 21, 2008.

Luan, "Annotating Gigapixel Images", Proceedings of the 21st Annual ACM Symposium on User Interface Software and Technology, Oct. 19-22, 2008.

"Collaboration Tool: WebEx", retrieved on Jun. 11, 2010.

WorldWide Telescope Home Page, Microsoft Research, retrieved on Aug. 5, 2010.

ChronoZoom Time Scale Home Page, retrieved on Aug. 5, 2010.

StarPlot: A 3-Dimensional Star Chart Viewer, Oct. 2006.

* cited by examiner

LOCALIZED THUMBNAIL PREVIEW OF RELATED CONTENT DURING SPATIAL BROWSING

BACKGROUND

Conventional spatial exploration tools typically provide for the browsing of spatial environments and present information related to objects in a field of view of the spatial environment, such as names, identifiers, and other related information. Such in-the-field-of-view presentation tends to clutter the field of view and obscure features of the environment being viewed. For example, conventional special exploration tools can become so cluttered with information that seeing an un-obscured image of the spatial environment becomes nearly impossible.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present examples provide technologies, systems, and methods for exploring a virtual space without cluttering or obscuring a field of view of the virtual space with overlaid names, labels, symbols, markers, and the like. Instead, a user may select objects of interest presented in a context bar to locate them in the field of view. Further, the user can make use of various forms of selection to zoom in on objects or points in the field of view and access information regarding the virtual space and objects without adding persistent clutter to the field of view.

Many of the attendant features will be more readily appreciated as the same become better understood by reference to the following detailed description considered in connection with the accompanying drawings.

DESCRIPTION OF THE DRAWINGS

The present description will be better understood from the following detailed description considered in connection with the accompanying drawings, wherein.

Like reference numerals are used to designate like parts in the accompanying drawings.

DETAILED DESCRIPTION

The detailed description provided below in connection with the accompanying drawings is intended as a description of the present examples and is not intended to represent the only forms in which the present examples may be constructed or utilized. The description sets forth at least some of the functions of the examples and/or the sequence of steps for constructing and operating examples. However, the same or equivalent functions and sequences may be accomplished by different examples.

Although the present examples are described and illustrated herein as being implemented in a computing environment, the environment described is provided as an example and not a limitation. As those skilled in the art will appreciate, the present examples are suitable for application in a variety of different types of computing environments.

Figure 1:
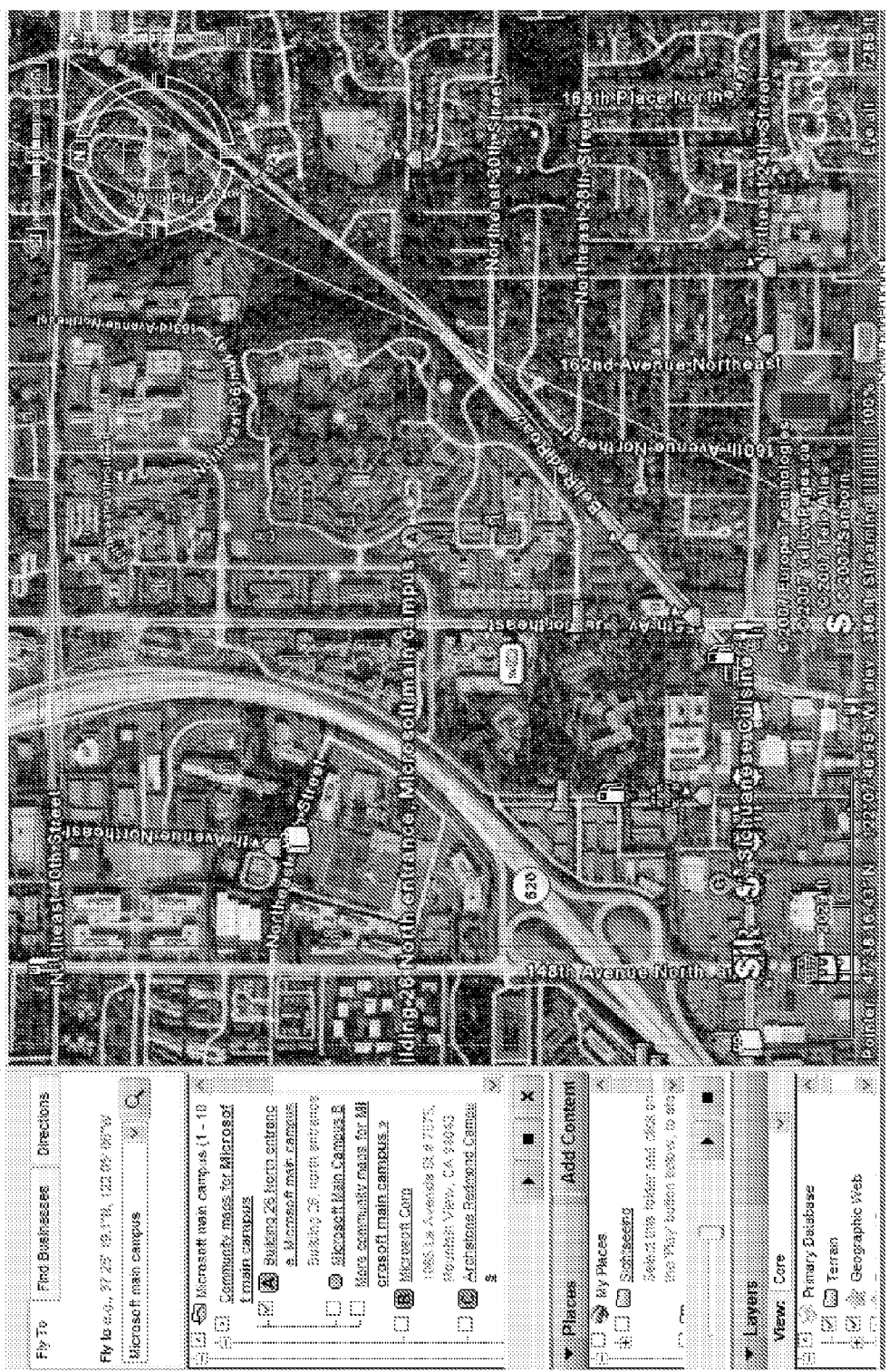
FIG. 1 is an example display from a conventional spatial exploration tool. In this example, field of view ("FOV") shows a satellite image of a surface of the earth.

FIG. 1 is an example display from a conventional spatial exploration tool. In this example, field of view ("FOV") 110 shows a satellite image of a surface of the earth. Unfortunately, the image in this example is cluttered and obscured by overlaid names, labels, symbols, markers, and the like. Conventional spatial exploration tools tend to use such an overlay display method as a matter of course such that it may not be possible for a user to view an unobscured virtual space image. The term "virtual space" as used herein generally refers to a representation of some special environment, actual or imaginary, from a particular point of reference, such as outer space (the Earth, for example, being a point of reference) or some other space from a particular point of reference (some point on the Earth such as a landscape or aerial view, for example). The term "spatial environment" as used herein generally refers to some space—a real space, virtual space, and/or imaginary space. Such spaces may, for example, be galactic, landscape, aerial, subatomic, or the like. The term "cluttered" as used herein with respect to a field of view typically refers to hindering, obscuring, covering, blocking, and/or the like a user's view of an image of the virtual space, and/or representations of objects within the virtual space, in the field of view with names, labels, symbols, markers, and the like overlaid on the image.

Figure 2:
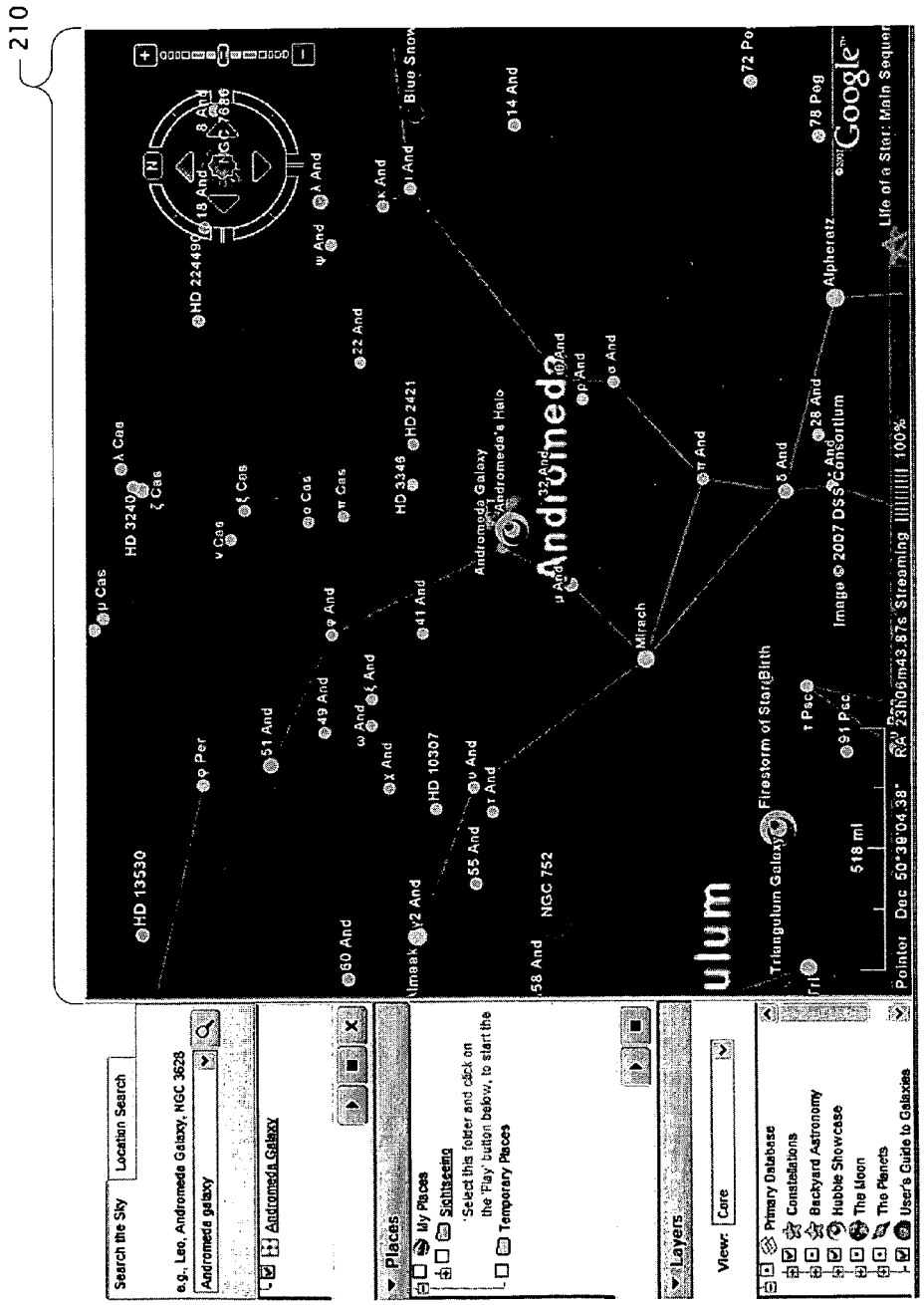
FIG. 2 is another example display from a conventional spatial exploration tool.

FIG. 2 is another example display from a conventional spatial exploration tool. In this example, FOV 210 shows a representation of outer space, the area of the Andromeda constellation in particular. Unfortunately, the image in this example does not take on the appearance of the actual space and is cluttered and obscured by overlaid names, labels, symbols, markers, and the like.

Figure 3:
FIG. 3 is an example display from an example improved spatial exploration tool.

FIG. 3 is an example display from an example improved spatial exploration tool. In this example, FOV 310 shows a representation of outer space, the area of the Andromeda constellation in particular, as in FIG. 2. In this example, the virtual space image takes on the appearance of the actual sky view and is generally not cluttered or obscured by overlaid names, labels, symbols, markers, and the like. Further, example object bar 320 typically presents thumbnail images of objects within the current FOV, such as FOV 310. A user may select a thumbnail to zoom in on the corresponding object and/or access information associated with the object. Further, a user may use a mouse control or the like to hover over a thumbnail (or otherwise indicate a desired thumbnail)

causing the corresponding object in FOV 310 to be indicated, such as by noticeably marking it or highlighting it or the like. As used herein, the term "object" refers to anything identifiable by the spatial exploration tool; for example, a road, landmark, galaxy, constellation, building, or anything else typically within the virtual space considered by the tool.

Figure 4:
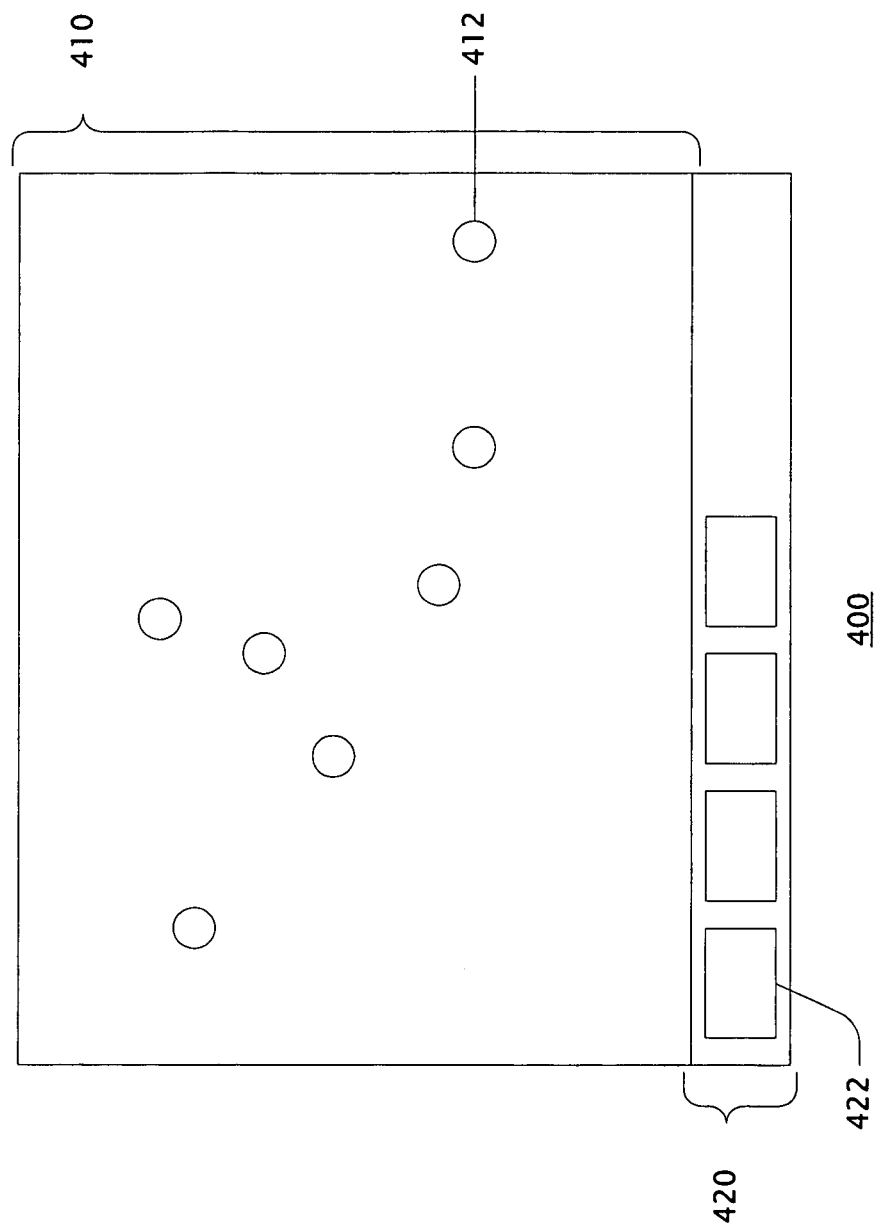
FIG. 4 is a block diagram of an example improved spatial exploration system.

FIG. 4 is a block diagram of an example improved spatial exploration system 400. System 400 includes field of view ("FOV") 410 and context bar 420. FOV 410 typically presents images of a virtual space including objects in the virtual space (examples represented by circles such as circle 412). Not shown in FIG. 4 are one or more data stores that provide virtual space and object images, information, and data to system 400. Using system 400, a user may generally browse or explore a virtual space by moving the FOV to a desired location in the virtual space via suitable user interface mechanisms. Further, the user may typically zoom in or out of the virtual space as desired, thus narrowing or widening the FOV respectively. Context bar 420 typically includes representations of objects in the current FOV (examples represented by rectangles such as rectangle 422). Typically (unlike shown in FIG. 4) there is at least one object representation in context bar 420 for each object in FOV 410. As the FOV changes, the objects represented in context bar typically change accordingly. In one example, representation 422 includes a thumbnail image of the object, as shown in FIG. 3. Such a thumbnail image may also include identification information such as a name or title of the object and/or other information related to the object. In general, FOV 410 of example system 400 is not cluttered or obscured by overlaid names, labels, symbols, markers, or the like as is common with conventional spatial exploration tools.

Figure 5:
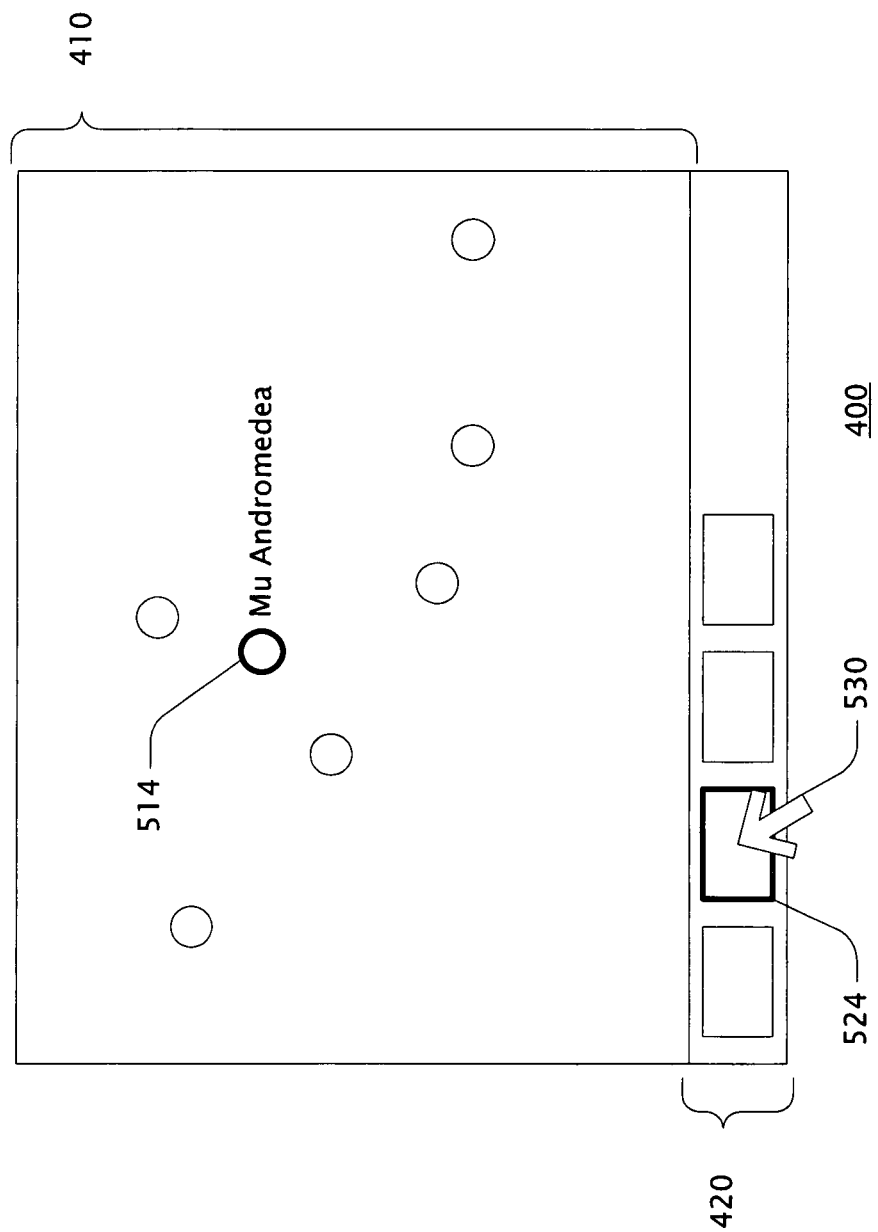
FIG. 5 is a block diagram showing the example improved spatial exploration system of FIG. 4 including one method of how to locate an object in the field of view.

FIG. 5 is a block diagram showing the example improved spatial exploration system 400 of FIG. 4 including one method of how to locate an object in the field of view. In this example, a user may locate an identified object in FOV 410 by selecting the corresponding thumbnail on context bar 420. In one example, a user may hover mouse cursor 530 over thumbnail 524 (as indicated by the bold rectangle) causing system 400 to highlight corresponding object 514 in FOV 410 (as indicated by the bold circle and the presentation of the example object name, "Mu Andomedea"). In this example, once mouse cursor 530 is removed from hovering over thumbnail 524 then system 400 removes the object highlighting. In general, a user may select any of the thumbnails presented in context bar 420, such selection causing system 400 to highlight the corresponding object in the FOV. De-selecting the thumbnails generally causes system 400 to un-highlight the corresponding object in the FOV. In this manner, the highlighting is not persistent and the FOV remains uncluttered showing only minimal additional information in response to a user selection and removing the information upon de-selection. Selection may be made via mouse cursor hovering over a thumbnail (as in the example above) or via any other suitable means or method or the like. Other forms of selection may be used to access other information regarding the virtual space and/or objects in the virtual space and/or FOV.

Figure 6:
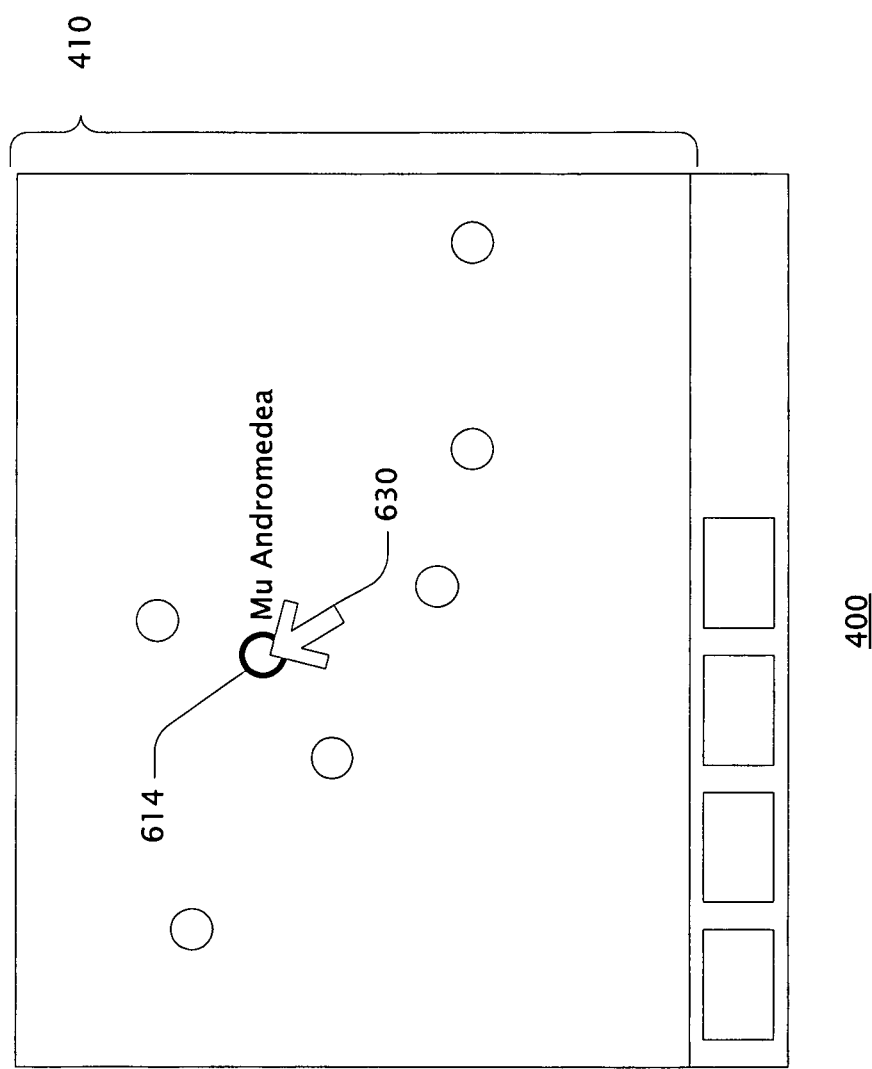
FIG. 6 is a block diagram showing the example improved spatial exploration system of FIG. 4 including one method of how to identify an object in the field of view.

FIG. 6 is a block diagram showing the example improved spatial exploration system 400 of FIG. 4 including one method of how to identify an object in the field of view. In this example, a user selects object 610 presented in FOV 410 by pointing to it with example mouse cursor 630. In one example, a user may hover mouse cursor 630 over object 614 causing system 400 to highlight object 614 in FOV 410 (as indicated by the bold circle and the presentation of the example object name, "Mu Andomedea"). In this example, once mouse cursor 630 is removed from hovering over object 614 then system 400 removes the object highlighting. In general, a user may select any object presented in FOV 410, such selection causing system 400 to highlight the corresponding object in the FOV if it is identified by system 400. If an object at cursor 630 is not identified, or if there is no object at cursor 630, then typically a nearby object is highlighted. De-selecting the object (moving cursor 630 away) generally causes system 400 to un-highlight the object in the FOV. In this manner, the highlighting is not persistent and the FOV remains uncluttered showing only minimal additional information in response to a user selection and removing the information upon de-selection. Selection may be made via mouse cursor hovering over a thumbnail (as in the example above) or via any other suitable means or method or the like. Other forms of selection may be used to access other information regarding the virtual space and/or objects in the virtual space and/or FOV.

Figure 7:
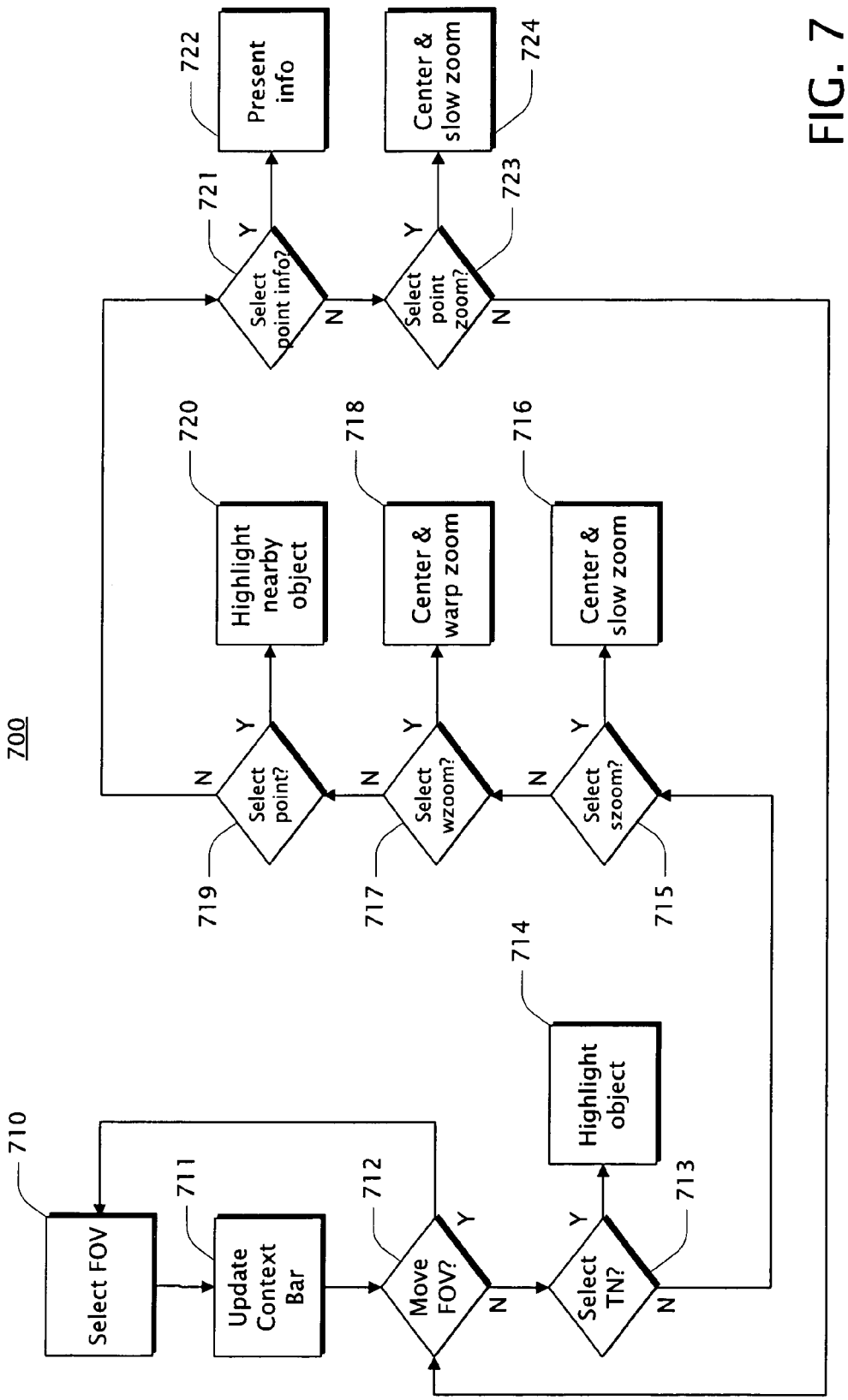
FIG. 7 is a block diagram showing an example method for exploring a virtual space without presenting a persistently cluttered field of view.

FIG. 7 is a block diagram showing an example method 700 for exploring a virtual space without presenting a persistently cluttered field of view. In one example, method 700 is used with the example improved spatial exploration system 400 of FIG. 4. Method 700 provides for an uncluttered FOV while allowing a user to explore a virtual space, identify objects in the virtual space, and obtain additional information related to the virtual space and objects.

Block 710 typically indicates selecting a particular FOV within a virtual space. In one example, a user may select a particular FOV as described in connection with FIG. 4. Once a particular FOV has been selected, method 700 typically continues at block 711.

Block 711 typically indicates updating a context bar, such as context bar 420 of FIG. 4. In one example, the context bar is updated by the improved spatial exploration system as described in connection with FIG. 4 to include thumbnail images of objects identified by the system within the current FOV. Once the context bar has been updated, method 700 typically continues at block 712.

Block 712 typically indicates detecting a change in the FOV. In one example, the user may change the FOV to another portion of the virtual space. Such changing can include moving position within the virtual space and/or zoom in our out of the virtual space. If the FOV is changes, method 700 typically continues at block 710. Otherwise, method 700 typically continues at block 713.

Block 713 typically indicates detecting an identification selection of a thumbnail ("TN"). In one example, identification selection of a thumbnail is made by selecting a thumbnail in a context bar as described in connection with FIG. 5. If a thumbnail is identification selected, method 700 typically continues at block 714. Otherwise, method 700 typically continues at block 715.

Block 714 typically indicates highlighting an object in response to a thumbnail selection. In one example, an object is highlighted in response to a thumbnail selection, and un-highlighted in response to a de-selection, as described in connection with FIG. 5. Once the object is highlighted, method 700 typically continues at block 715.

Block 715 typically indicates detecting a smooth zoom ("szoom") selection of a thumbnail. In one example, smooth zoom selection of a thumbnail is made by left mouse clicking a thumbnail in a context bar. Other methods of smooth zoom selection may alternatively be used. If a thumbnail is smooth zoom selected, method 700 typically continues at block 716. Otherwise, method 700 typically continues at block 717.

Block 716 typically indicates zooming in to a close up view of the object in the FOV corresponding to the smooth zoom selected thumbnail. Once the zoom is complete, method 700 typically continues at block 712.

Block 717 typically indicates detecting a warp zoom ("wzoom") selection of a thumbnail. In one example, warp zoom selection of a thumbnail is made by double mouse clicking a thumbnail in a context bar. Other methods of warp zoom selection may alternatively be used. A warp zoom is typically a cross-fade—a blend transition from one image to another (e.g., one image fades out while the other image fades in). Alternatively, a warp zoom may be an immediate transition from one image to another. If a thumbnail is warp zoom selected, method 700 typically continues at block 718. Otherwise, method 700 typically continues at block 719.

Block 718 typically indicates warp zooming or cross-fading in to a close up view of the object in the FOV corresponding to the warp zoom selected thumbnail. Once the cross-fade is complete, method 700 typically continues at block 712.

Block 719 typically indicates detecting a point selection in the FOV. In one example, a point selection in the FOV is made by moving a mouse cursor to point to a particular point in the FOV and hovering the mouse cursor over the same point for a conventional period of time. Other methods of point selection may alternatively be used. If a point in the FOV is selected, method 700 typically continues at block 720. Otherwise, method 700 typically continues at block 721.

Block 720 typically indicates highlighting the object that is point selected or an object close to the point in the FOV that is point selected. In one example, the identified object in the virtual space closest to the point selected is highlighted. In one example, the highlighting and un-highlighting is performed as described in connection with FIG. 6. Once the highlighting is complete, method 700 typically continues at block 721.

Block 721 typically indicates detecting an information selection of a point in the FOV. In one example, information selection of a point in the FOV is made by moving a mouse cursor to point to a particular point or object in the FOV and keeping the mouse cursor pointing to the same point or object for a conventional period of time. Other methods of information selection of a point may alternatively be used. If point information in the FOV is selected, method 700 typically continues at block 722. Otherwise, method 700 typically continues at block 723.

Block 722 typically indicates presenting information about the object that is selected or an object close to the point in the FOV that is information selected. In one example, information is presented in a pop-up dialog box. In this example, once the point is de-selected, the information is no longer presented. Once the information is presented, method 700 typically continues at block 723.

Block 723 typically indicates detecting a point zoom selection in the FOV. In one example, point zoom selection in the FOV is made by double mouse clicking a point in the FOV. Other methods of point zoom selection may alternatively be used. If a point zoom in the FOV is selected, method 700 typically continues at block 724. Otherwise, method 700 typically continues at block 712.

Block 724 typically indicates zooming in to a close up view of the point in the FOV corresponding to the point zoom selection. Once the zoom is complete, method 700 typically continues at block 712.

Figure 8:
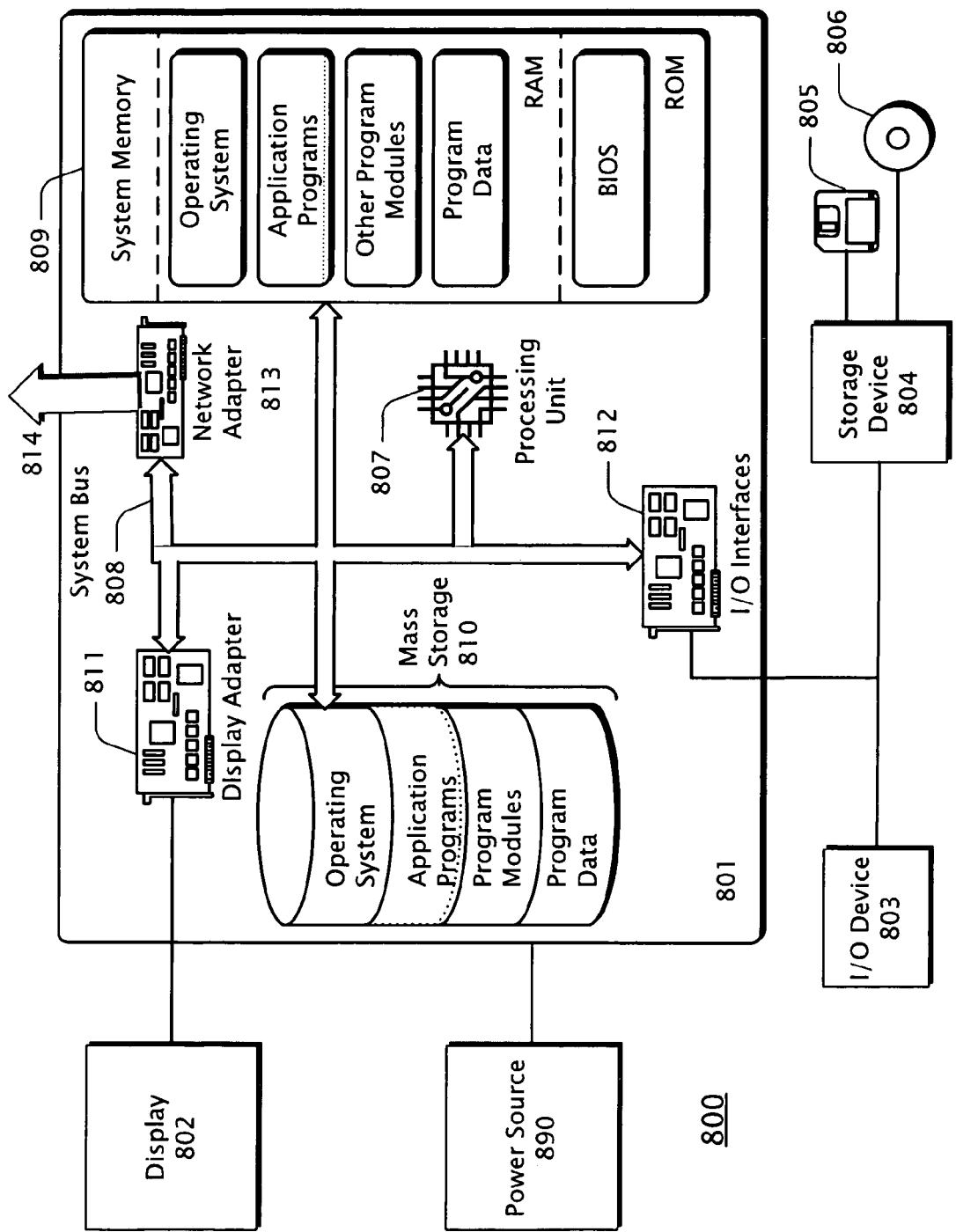
FIG. 8 is a block diagram showing an example computing environment in which the technologies described herein may be implemented.

FIG. 8 is a block diagram showing an example computing environment 800 in which the technologies described herein may be implemented. A suitable computing environment may be implemented with numerous general purpose or special purpose systems. Examples of well known systems may include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 800 typically includes a general-purpose computing system in the form of a computing device 801 coupled to various components, such as peripheral devices 802, 803, 804 and the like. System 800 may couple to various other components, such as input devices 803, including voice recognition, touch pads, buttons, keyboards and/or pointing devices, such as a mouse or trackball, via one or more input/output ("I/O") interfaces 812. The components of computing device 801 may include one or more processors (including central processing units ("CPU"), graphics processing units ("GPU"), microprocessors ("µP"), and the like) 807, system memory 809, and a system bus 808 that typically couples the various components. Processor 807 typically processes or executes various computer-executable instructions to control the operation of computing device 801 and to communicate with other electronic and/or computing devices, systems or environment (not shown) via various communications connections such as a network connection 814 or the like. System bus 808 represents any number of several types of bus structures, including a memory bus or memory controller, a peripheral bus, a serial bus, an accelerated graphics port, a processor or local bus using any of a variety of bus architectures, and the like.

System memory 809 may include computer readable media in the form of volatile memory, such as random access memory ("RAM"), and/or non-volatile memory, such as read only memory ("ROM") or flash memory ("FLASH"). A basic input/output system ("BIOS") may be stored in non-volatile or the like. System memory 809 typically stores data, computer-executable instructions and/or program modules comprising computer-executable instructions that are immediately accessible to and/or presently operated on by one or more of the processors 807.

Mass storage devices 804 and 810 may be coupled to computing device 801 or incorporated into computing device 801 via coupling to the system bus. Such mass storage devices 804 and 810 may include non-volatile RAM, a magnetic disk drive which reads from and/or writes to a removable, non-volatile magnetic disk (e.g., a "floppy disk") 805, and/or an optical disk drive that reads from and/or writes to a non-volatile optical disk such as a CD ROM, DVD ROM 806. Alternatively, a mass storage device, such as hard disk 810, may include non-removable storage medium. Other mass storage devices may include memory cards, memory sticks, tape storage devices, and the like.

Any number of computer programs, files, data structures, and the like may be stored in mass storage 810, other storage devices 804, 805, 806 and system memory 809 (typically limited by available space) including, by way of example and not limitation, operating systems, application programs, data files, directory structures, computer-executable instructions, and the like.

Output components or devices, such as display device 802, may be coupled to computing device 801, typically via an interface such as a display adapter 811. Output device 802 may be a liquid crystal display ("LCD"). Other example output devices may include printers, audio outputs, voice outputs, cathode ray tube ("CRT") displays, tactile devices or other sensory output mechanisms, or the like. Output devices may enable computing device 801 to interact with human operators or other machines, systems, computing environments, or the like. A user may interface with computing environment 800 via any number of different I/O devices 803 such as a touch pad, buttons, keyboard, mouse, joystick, game pad, data port, and the like. These and other I/O devices may be coupled to processor 807 via I/O interfaces 812 which may be coupled to system bus 808, and/or may be coupled by other interfaces and bus structures, such as a parallel port, game port, universal serial bus ("USB"), fire wire, infrared ("IR") port, and the like.

Computing device 801 may operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 801 may be coupled to a network via network adapter 813 or the like, or, alternatively, via a modem, digital subscriber line ("DSL") link, integrated services digital network ("ISDN") link, Internet link, wireless link, or the like.

Communications connection 814, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media may include wired media, such as a wired network or direct-wired connection or the like, and wireless media, such as acoustic, radio frequency, infrared, or other wireless communications mechanisms.

Power source 890, such as a battery or a power supply, typically provides power for portions or all of computing environment 800. In the case of the computing environment 800 being a mobile device or portable device or the like, power source 890 may be a battery. Alternatively, in the case computing environment 800 is a desktop computer or server or the like, power source 890 may be a power supply designed to connect to an alternating current ("AC") source, such as via a wall outlet.

Some mobile devices may not include many of the components described in connection with FIG. 8. For example, an electronic badge may be comprised of a coil of wire along with a simple processing unit 807 or the like, the coil configured to act as power source 890 when in proximity to a card reader device or the like. Such a coil may also be configure to act as an antenna coupled to the processing unit 807 or the like, the coil antenna capable of providing a form of communication between the electronic badge and the card reader device. Such communication may not involve networking, but may alternatively be general or special purpose communications via telemetry, point-to-point, RF, IR, audio, or other means. An electronic card may not include display 802, I/O device 803, or many of the other components described in connection with FIG. 8. Other mobile devices that may not include many of the components described in connection with FIG. 8, by way of example and not limitation, include electronic bracelets, electronic tags, implantable devices, and the like.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

The invention claimed is:

1. A method performed on a computing device, the method for exploring a virtual space, the method comprising:
presenting, via a field of view, a portion of the virtual space;
presenting, via the field of view, representations of objects in the portion of the virtual space, where the presenting is based on the objects being located within the portion of the virtual space;
presenting, in a context bar that is located outside of the field of view, thumbnail images of the objects that are distinct from the presented representations of the objects in the field of view, where the context bar is configured for presenting other thumbnail images of other objects presented in a changed field of view;
highlighting one object of the objects in response to a corresponding image of the images of the objects being selected via a first type of user input, the highlighting being removed in response to the corresponding image of the images of the objects being de-selected;
centering the field of view on, and zooming in on, the one object of the objects in response to the corresponding image of the images of the objects being selected via a second type of user input;
centering the field of view on, and cross-fading in on, the one object of the objects in response to the corresponding image of the images of the objects being selected via a third type of user input;
highlighting a closest object of the objects relative to a point in the virtual space presented via the field of view in response to the point being selected via a fourth type of user input, the highlighting removed in response to the point being de-selected;
presenting information related to the closest object of the objects relative to the point in the virtual space presented via the field of view in response to the point being selected via a fifth type of user input; and centering the field of view on, and zooming in on, the point in the virtual space presented via the field of view in response to the point being selected via a sixth type of user input.

2. The method of claim 1 where the virtual space represents outer space.

3. The method of claim 1 where the virtual space represents a landscape.

4. The method of claim 1 where the presenting the portion of the virtual space includes presenting an actual image of a spatial environment represented by the virtual space.

5. The method of claim 1 where the corresponding image is a thumbnail image.

6. The method of claim 5 where the thumbnail image is presented along with identification information.

7. The method of claim 1 where the highlighting includes presenting identification information.

8. A computing device and at least one program module together configured for exploring a virtual space based on actions comprising:
   presenting, via a field of view, a portion of the virtual space;
   presenting, via the field of view, representations of objects in the portion of the virtual space, where the presenting is based on the objects being located within the portion of the virtual space;
   presenting, in a context bar that is located outside of the field of view, thumbnail images of the objects that are distinct from the presented representations of the objects in the field of view, where the context bar is configured for presenting other thumbnail images of other objects presented in a changed field of view;
   highlighting one object of the objects in response to a corresponding image of the images of the objects being selected via a first type of user input, the highlighting being removed in response to the corresponding image of the images of the objects being de-selected;
   centering the field of view on, and zooming in on, the one object of the objects in response to the corresponding image of the images of the objects being selected via a second type of user input;
   centering the field of view on, and cross-fading in on, the one object of the objects in response to the corresponding image of the images of the objects being selected via a third type of user input;
   highlighting a closest object of the objects relative to a point in the virtual space presented via the field of view in response to the point being selected via a fourth type of user input, the highlighting removed in response to the point being de-selected;
   presenting information related to the closest object of the objects relative to the point in the virtual space presented via the field of view in response to the point being selected via a fifth type of user input; and
   centering the field of view on, and zooming in on, the point in the virtual space presented via the field of view in response to the point being selected via a sixth type of user input.

9. The computing device and the at least one program module of claim 8 where the virtual space represents outer space.

10. The computing device and the at least one program module of claim 8 where the virtual space represents a landscape.

11. The computing device and the at least one program module of claim 8 where the presenting the portion of the virtual space includes presenting an actual image of a spatial environment represented by the virtual space.

12. The computing device and the at least one program module of claim 8 where the corresponding image is a thumbnail image.

13. The computing device and the at least one program module of claim 8 where the thumbnail image is presented along with identification information.

14. The computing device and the at least one program module of claim 8 where the highlighting includes presenting identification information.

15. At least one computer storage device storing computer-executable instructions that, when executed by a computing device, cause the computing device to perform a method of exploring a virtual space, the method comprising:
   presenting, via a field of view, a portion of the virtual space;
   presenting, via the field of view, representations of objects in the portion of the virtual space, where the presenting is based on the objects being located within the portion of the virtual space;
   presenting, in a context bar that is located outside of the field of view, thumbnail images of the objects that are distinct from the presented representations of the objects in the field of view, where the context bar is configured for presenting other thumbnail images of other objects presented in a changed field of view;
   highlighting one object of the objects in response to a corresponding image of the images of the objects being selected via a first type of user input, the highlighting being removed in response to the corresponding image of the images of the objects being de-selected;
   centering the field of view on, and zooming in on, the one object of the objects in response to the corresponding image of the images of the objects being selected via a second type of user input;
   centering the field of view on, and cross-fading in on, the one object of the objects in response to the corresponding image of the images of the objects being selected via a third type of user input;
   highlighting a closest object of the objects relative to a point in the virtual space presented via the field of view in response to the point being selected via a fourth type of user input, the highlighting removed in response to the point being de-selected;
   presenting information related to the closest object of the objects relative to the point in the virtual space presented via the field of view in response to the point being selected via a fifth type of user input; and
   centering the field of view on, and zooming in on, the point in the virtual space presented via the field of view in response to the point being selected via a sixth type of user input.

16. The computer storage device of claim 15 where the virtual space represents outer space.

17. The computer storage device of claim 15 where the virtual space represents a landscape.

18. The computer storage device of claim 15 where the presenting the portion of the virtual space includes presenting an actual image of a spatial environment represented by the virtual space.

19. The computer storage device of claim 15 where the corresponding image is a thumbnail image.

20. The computer storage device of claim 15 where the thumbnail image is presented along with identification information, or where the highlighting includes presenting identification information.

* * * * *